March 9, 1965  C. S. MYERS ETAL  3,173,085
MAGNETIC PARTICLE FLOW TESTING APPARATUS WITH OVERHEAD
SUPPORT RAILS FOR THE TESTED ARTICLE
AND ITS MAGNETIZING MEANS Filed June 8, 1960  5 Sheets-Sheet 1

Inventors
Charles Stowe Myers
Anton E. Christensen

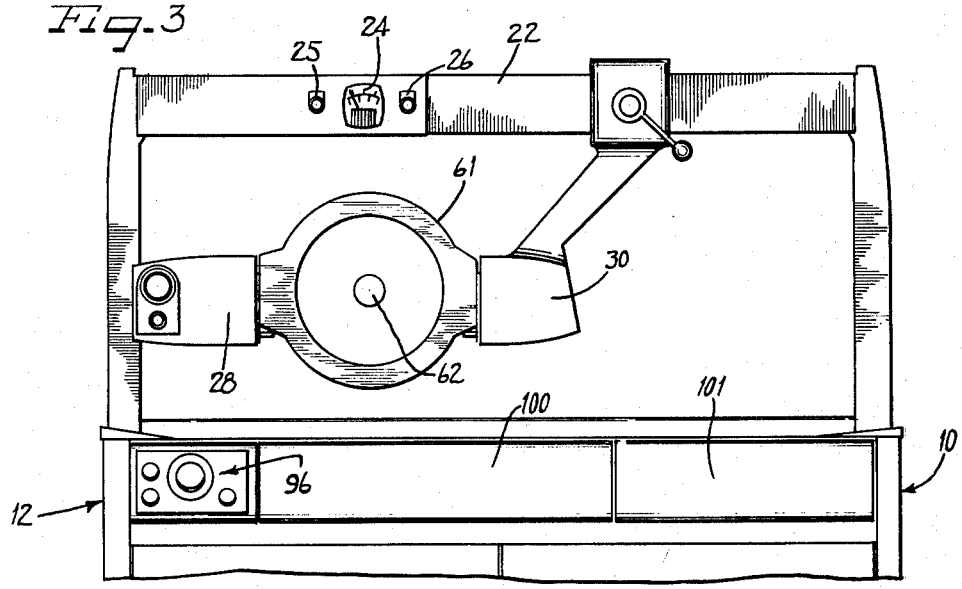
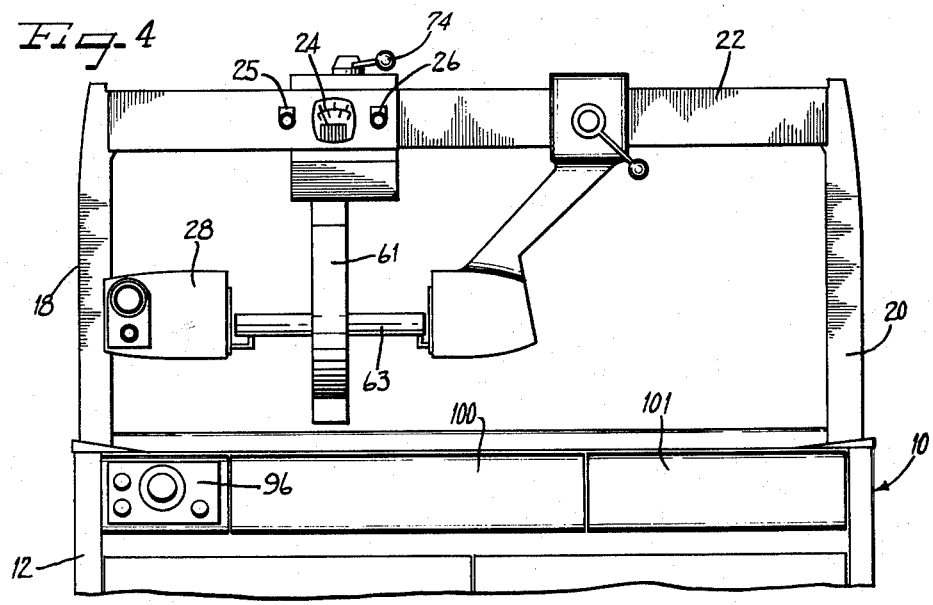

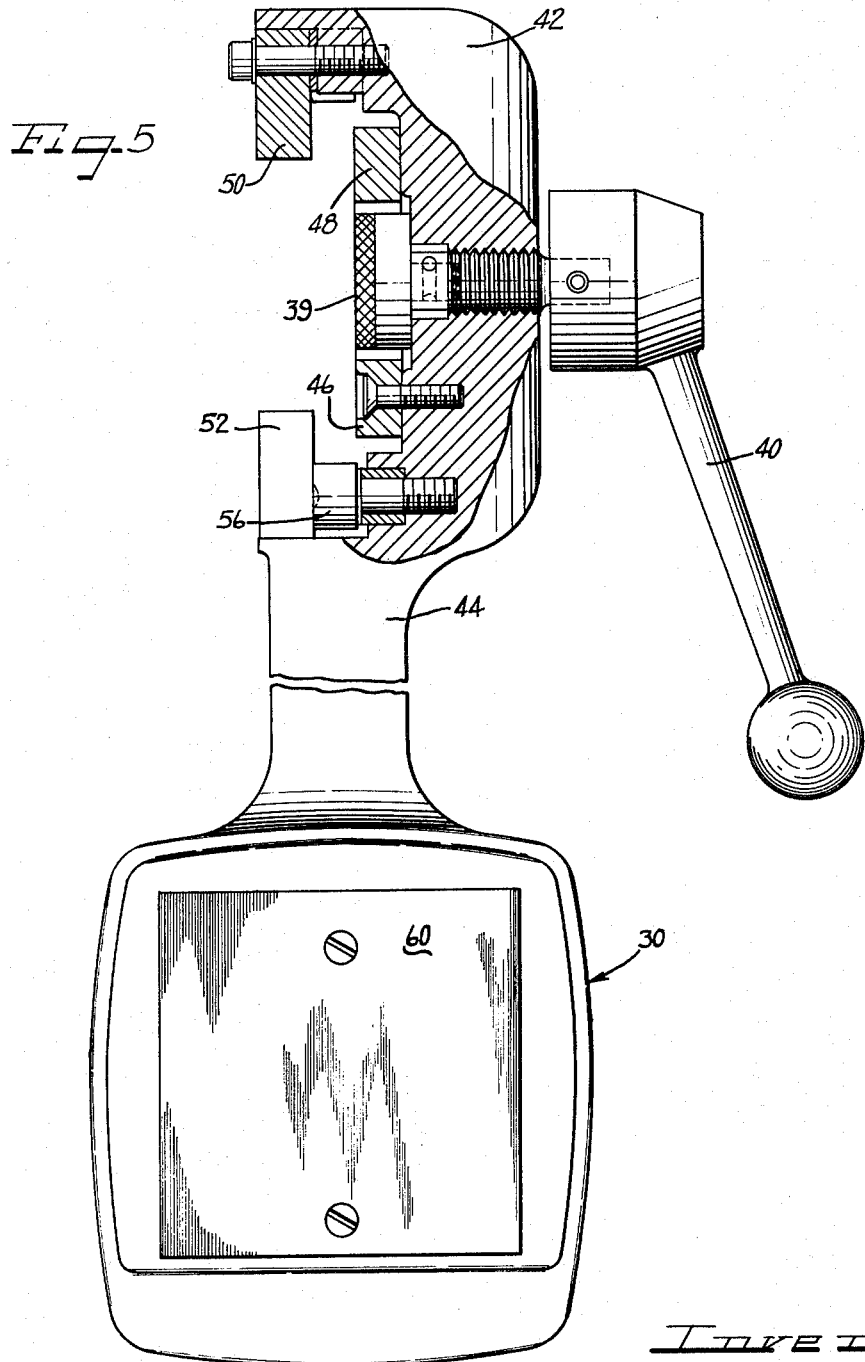

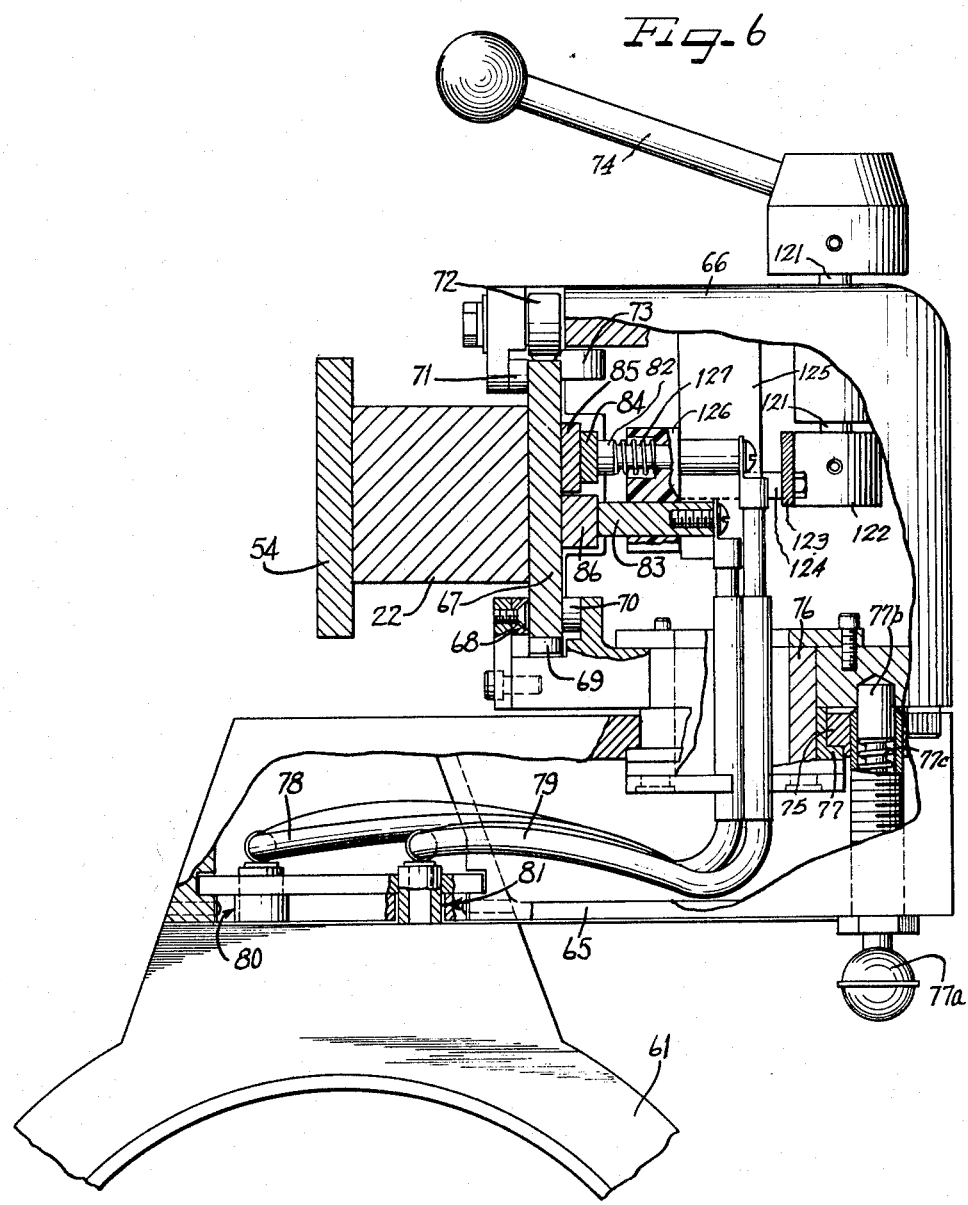

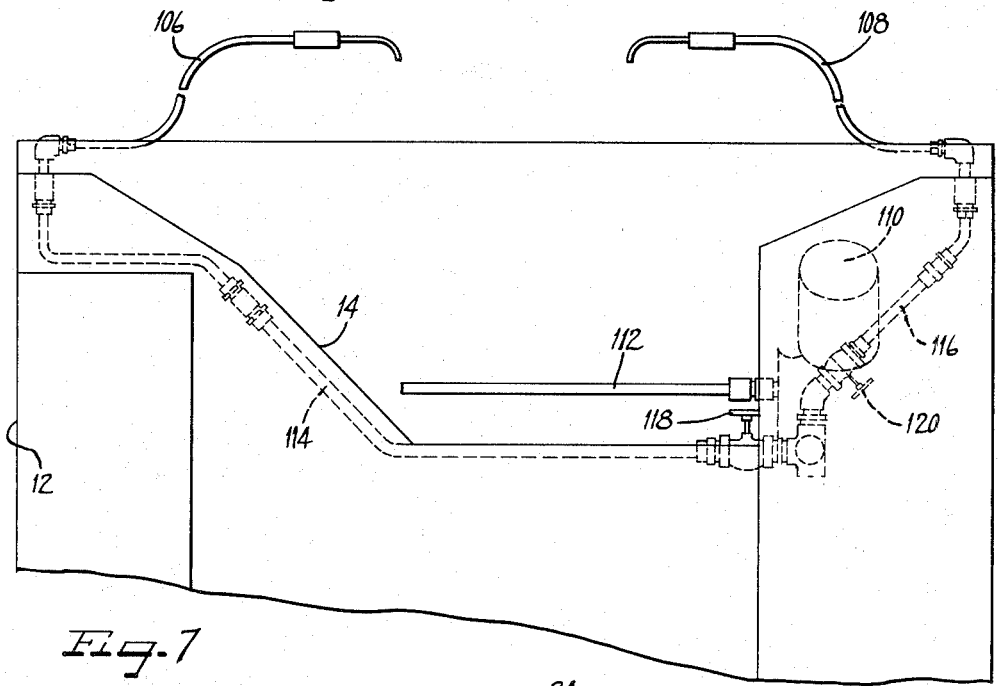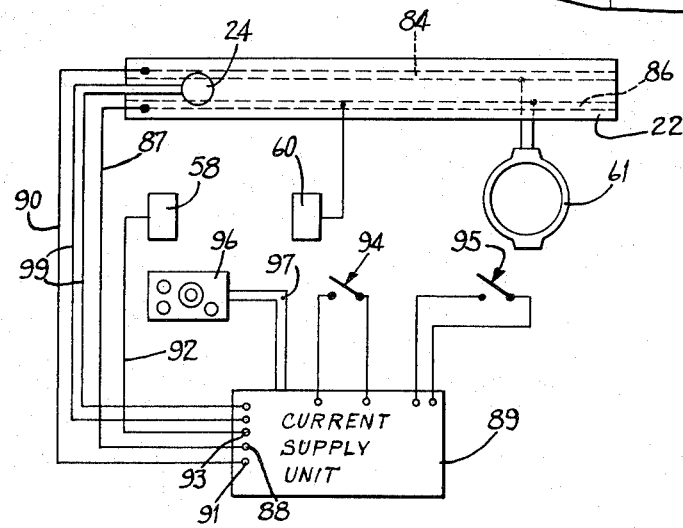

United States Patent Office 3,173,085
Patented Mar. 9, 1965

3,173,085
MAGNETIC PARTICLE FLAW TESTING APPARATUS WITH OVERHEAD SUPPORT RAILS FOR THE TESTED ARTICLE AND ITS MAGNETIZING MEANS
Charles Stowe Myers, Evanston, and Anton E. Christensen, Palatine, Ill., assignors, by mesne assignments, to Magnaflux Corporation, Chicago, Ill., a corporation of Delaware
Filed June 8, 1960, Ser. No. 34,828
7 Claims. (Cl. 324—38)

This invention relates to apparatus for magnetically testing for defects in metal parts and the like, and more particularly to an apparatus having an overhead support rail for adjustably supporting means for magnetizing parts to be tested.

In the application of finely divided ferromagnetic particles to the exterior surfaces of parts for testing purposes, the particles may be suspended in a thin oil or water vehicle and sprayed over the surfaces, so that defects show up as concentrations of particles induced by the interruption of surface lines of force in a magnetized part. However, the spraying has impeded efficient processing of parts, because of the consequent gumming and coating of table surfaces. Also, the cables used in magnetization have been subject to short circuiting as the result of their impregnation by the fluid used, and testing has been hampered by the fact that in general but one part could be tested at a time.

The present invention resolves these problems by means of a guide rail and support structure which is mounted in overlying relationship to a table and fluid-receiving tank by a pair of upright posts. One of the posts has a headstock structure fixedly secured thereto intermediate its upper and lower ends, and the rail carries a depending tailstock for adjustment longitudinally thereof, the headstock and tailstock being provided with contact plates which preferably are constructed with leaded copper braid for safety and durability, and with removable shelves and V-blocks for supporting the parts to be tested. The rail also carries a depending magnetizing coil which is movable past the tailstock, and which carries V-blocks so that other parts can be supported therein, for simultaneous testing with parts positioned in the headstock and tailstock if so desired.

The electrical conduits are received in the rail support means so that no external cables are required, such as have heretofore created a hazard as described and the rail is provided with bus bars affording electrical connection with the tailstock and coils of the invention. The table top of the apparatus is therefore unobstructed for easier conveyorized handling, and controls are grouped closely so that fewer movements are needed in use.

Accordingly, it is an object of the present invention to provide an apparatus for magnetically testing metal parts for defects wherein exposed electrical conduits are eliminated and conveyorized handling of parts is rendered simple and efficient.

Another object of the invention is to provide an apparatus as described wherein parts to be tested are supported by an overhead rail means whereby interference with the testing procedure from the presence of gummed testing fluids on table surfaces or the like is eliminated.

Another object of the invention is to provide an apparatus as described wherein the rail support is formed with bus bar means whereby depending magnetizing means may be adjustably positioned longitudinally thereof.

Another object of the invention is to provide a testing apparatus as described, in which a depending tailstock is mounted on the rail support in adjustably spaced relationship to a headstock member on a post for the rail support, and a coil is dependingly mounted on the rail support for freely adjustable movement longitudinally thereof and relative to said tailstock.

Other objects and advantages of the invention will become apparent as the description proceeds in accordance with the drawings, in which:

FIGURE 3 and 4 are views substantially corresponding to the showing of FIGURE 1 but representing different ways of utilizing the invention;

FIGURE 5 is an enlarged end view, partly broken away, of the support means for the depending tailstock of the invention;

FIGURE 6 is an enlarged end view, partly broken away, of the support means for the coil;

FIGURE 7 is a diagrammatic showing of electrical connections for the testing apparatus of the invention; and FIGURE 8 is a diagrammatic showing of fluid circulation means therefor.

Figure 1:
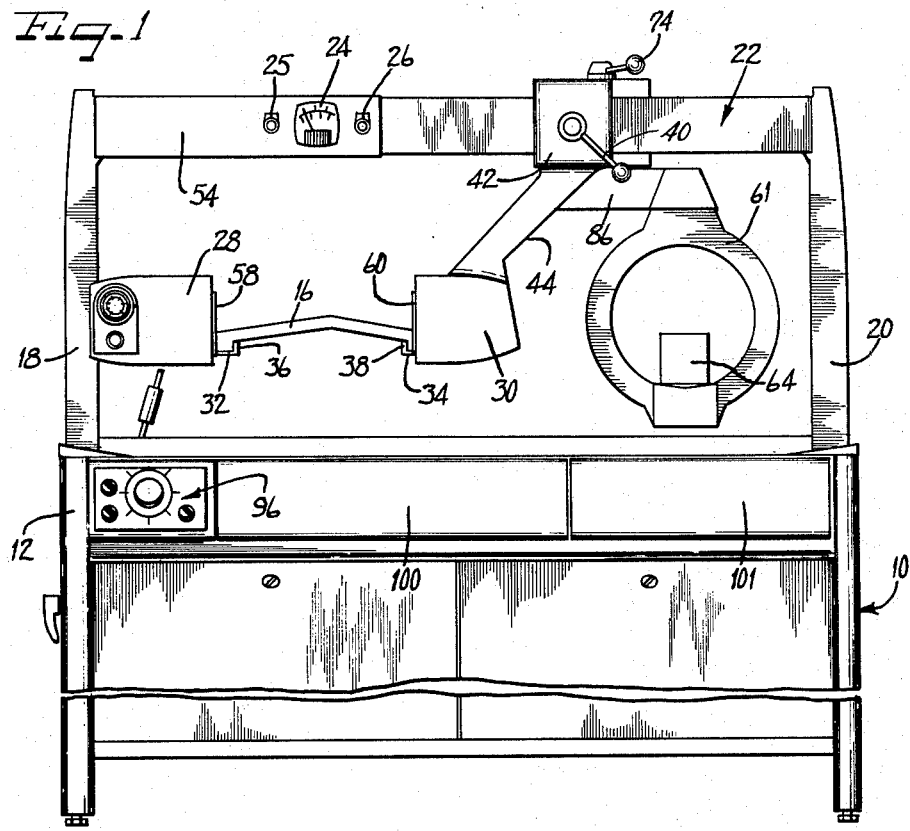
FIGURE 1 is a front elevational view of a testing apparatus according to the present invention.
Figure 2:
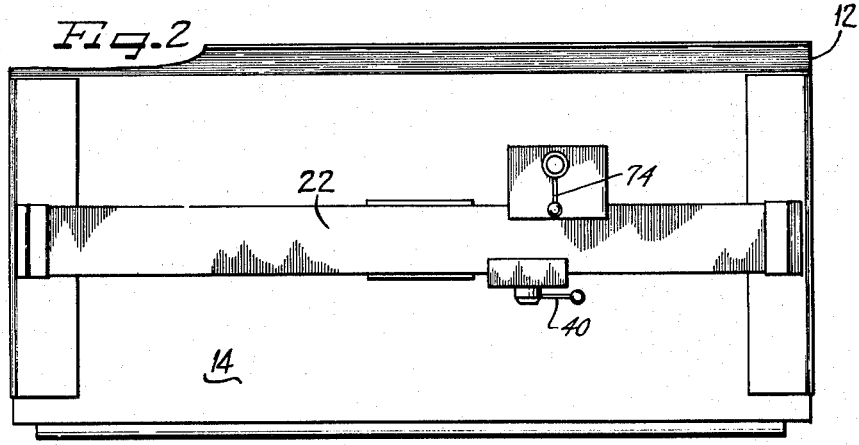
FIGURE 2 is a top plan view of the apparatus of the invention seen in FIGURE 1.

Referring now to the drawings, a testing apparatus 10 is shown according to the invention which includes a table 12 defining a bin or tank 14 for receiving fluid such as a thin oil or water carrying finely divided ferromagnetc particles in suspension for applying such particles to a metal part 16 to be tested. Suitable grill means (not shown) may be removably positioned upon the table in overlying relationship to the bin 14. A pair of upright support posts 18 and 20 are mounted at the ends of the table in spaced parallel relationship and in supporting relationship to a rail 22 extending in overlying relationship to the bin 14 as hereinafter set forth. The rail is provided with an ammeter 24 and pilot lights 25 and 26 in position for easy visual access.

The post 18 supports a headstock 28, and a tailstock 30 is mounted on the rail 22 in depending, longitudinally adjustable relationship, the headstock and the tailstock being in horizontal registration and each provided with a removable shelf as indicated at 32 and 34, and a removable V-block, 36 and 38, for positioning a part such as the part 16 for testing. The headstock is provided with suitable pneumatic control means (not shown) for indexing the rate at which parts are processed, as by conveyorized handling, and as seen in FIGURE 5, the tailstock is provided with a clamping disc 39 controlled by a manually operable handle 40 threadedly received in a guide head 42 integrally formed with the depending arm 44 of the tailstock. The guide head 42 is formed with an annular bearing plate having lower and upper portions 46 and 48 and opposed bearing shoes 50 and 52 coacting with a flange 54 of the rail 22 in guiding the tailstock, and cam follower means 56 are provided to assist in controlling the movement of the tailstock along the rail, as determined by the locking and release action of the clamping disc 39 and the handle 40. Thus when the handle 40 is in the release position, the disc 39 is moved from locking engagement with flange 54 and the tailstock can be manually adjusted longitudinally along the rail 22.

The contact plates 58 and 60 are preferably square so that they can be removed, then rotated 90°, 180°, or 270° and then reinserted into the headstock 28 or tailstock 30, so that wear on the plates can be distributed.

A part 16 may be disposed between and engaged with the contact plates 58 and 60, as shown in FIGURE 1, with the contact plates 58 and 60 being then connected to a source of electrical current to pass current through the part 16 for the testing operation. It is also possible to place a coil 61 between the contact plates 58 and 60 and to then position a part 62 to be tested within the coil 61.

In the alternative, the coil 61 may be suspended from the rail 22, either in a position surrounding a part 63 positioned between contacts 58 and 60, as illustrated in FIGURE 4, or in a position as illustrated in FIGURE 1 in which a part 64 may be magnetized and tested simultaneously with the testing of the part 16 between contacts 58 and 60. It will thus be apparent that the apparatus is very versatile.

The means for supporting coil 61 from the rail 22 is illustrated in FIGURE 6. Referring thereto, the coil 61 is arranged to be secured at one end thereof to the underside of an arm 65. The arm 65 is supported from a slidable member in the form of a casting 66 which is supported on a flange 67 on the rearward side of the overhead rail 22. Casting 66 carries shoes or slides 68, 69 and 70, respectively engaged with the lower inside surface of flange 67, the lower end surface of flange 67, and the lower outside surface of flange 67. The casting 66 further carries a shoe or slide 71 engaged with the upper inside or forward surface of the flange 67. A pair of rollers 72 and 73 are incorporated to facilitate easy movement for positioning of the coil 61. A handle 74 is actuated to lock the coil-support in a selected position, in a manner hereinafter described.

To support arm 65 from the casting 66, an upper wall 75 of the arm 65 has an opening which receives a stud 76 depending from the casting 66, the stud 76 including an annular flange 77 on its lower end, against which the wall 75 rests. There is thus provided a support which permits pivotal movement of arm 65 about the vertical axis of stud 76. This permits positioning of the coil 61 in surrounding relation to a part 63 disposed between the contact plates 58 and 60, as shown in FIGURE 4, while permitting movement of the coil past the tailstock 30 to a position as illustrated in FIGURE 1. The coil-support arm 65 is locked in a selected position by a plunger 77a having an upper end 77b engageable in openings in the casting 66, the plunger 77a being urged upwardly by a spring 77c.

To supply electrical current to the coil 61, a pair of wires 78 and 79 within the arm 65 are connected to coil terminals 80 and 81 and the wires 78 and 79 extend upwardly through the stud 76 to a pair of contact shoes 82 and 83. Contact shoe 82 engages a bus bar 84 which is supported from the flange 67 through a strip 85 of insulating material. Contact 83 engages a bus bar 86 which is fixed and electrically connected to the flange 67. Contact shoes 82 and 83 are controlled by handle 74 to frictionally lock the coil-support against movement, as described hereinafter.

Referring now to FIGURE 7, the rail 22 is adapted to provide an electrical connection to the tailstock contact 60, as well as to one terminal of the coil 61 through the bus bar 86, and is connected through a wire 87 to a terminal 88 of a current supply unit 89. The bus bar 84 is connected through a wire 90 to another terminal 91 of the unit 89, while the headstock contact 58 is connected through wire 92 to a terminal 93 of the current supply unit 89. A pair of control switches 94 and 95 are connected to the unit 89, to respectively control the supply of current to the headstock contact 58 and the bus bar 84. The amount of current may be controlled through a unit 96 mounted on the front of the table 12 and connected through a flexible shaft 97 to the unit 89, which may preferably be located in the lower portion of the table. To indicate the amount of current flow, an ammeter 24 is connected to the current supply unit through wires 99, and since 1700 amperes is sufficient in the embodiment shown, it will be understood that considerable power savings are afforded. The wires 87, 90, 92 and 99, of course, extend through the post 18. It may be noted that the switches 94 and 95 may be controlled by depressable plates 100 and 101 on the front side of the table 12, and if desired, other forms of switches, such as foot switches may be employed.

As seen in FIGURE 8, finely divided ferromagnetic particles in suspension are sprayed onto the parts to be tested through flexible conduits such as 106 and 108 which are supplied by pump means 110 positioned in the table 12 and connected to the bin 14 to draw fluid therefrom. The conduit 112 is an agitator tube connected to the pump 110 discharge and functions to maintain the ferromagnetic particles in suspension. The conduits 106 and 108 are connected to rigid conduits 114 and 116 which in turn are connected to the pump 110 and preferably provided with manually operable valves 118 and 120 for controlling the supply of fluid sprayed through the conduits 106 and 108 and falling into the bin 14. It will be appreciated that one of the conduits, i.e., 106, may apply spray to a part such as 16 between the headstock 28 and tailstock 30 while the other conduit 108 may apply spray to a part 65 in coil 61.

As above described, the contact shoes 82 and 83 (FIGURE 6) are controlled by movement of the handle 74 to frictionally lock the coil-support against movement. In particular, handle 74 is affixed to the upper end of a vertical shaft 121 journalled in the casting 66. At its lower end, shaft 121 carries a cam 122 engageable with a plate 123. Plate 123 is journalled for movement horizontally, toward and away from the rail 67, by a pair of bolts affixed thereto, including a bolt 124 which extends through a flange 125 formed in the inside of the casting wall. The bolts carry a block 126 of insulating material. Contact 82 has a reduced diameter shank extending through block 126, a spring 127 being disposed on the shank portion to urge the contact 82 toward engagement with the strip 84, and to urge plate 123 into engagement with the cam 122. Contact 83 is affixed to the block 126. When lever 74 is rotated, cam 122 engages plate 123 to move block 126 toward rail 67, to firmly engage contact shoe 83 with bus bar 86 and to increase the pressure between contact shoe 82 and bus bar 84. This arrangement not only provides the desired frictional locking, but insures good electrical contact.

Although we have herein set forth and described our invention with respect to certain specific principles and details thereof, it will be obvious to those skilled in the art that these may be varied without departing from the spirit and scope of the invention as set forth in the hereunto appended claims.

We claim as our invention:

1. An apparatus for testing metal parts and the like for flaws comprising a base, a receptacle in said base, an overhead rail, vertical post means supporting said rail, a headstock on said post means, a tailstock depending from said rail in adjustable relation thereto, a coil selectively positionable between said headstock and said tailstock for inducing magnetic flux in a part which may be inserted therethrough and movable past the tailstock to position the tailstock between the headstock and the coil and fluid supply means for spraying magnetic particles in the area of said coil and into said receptacle.

2. A magnetic flaw detection apparatus comprising a rail, post means suporting the rail, a magnetizing means mounted on said post means, magnetizing means depending from said rail and movable therealong, means for applying magnetic particlest to an article which may be held between said magnetizing means and a magnetizing coil adjustably supported by said rail in depending relationship thereto, said rail having a pair of longitudinally extending flanges on opposite sides thereof, one of said flanges guiding said depending magnetizing means and the other of said flanges guiding said coil, said coil and said magnetizing means being dimensioned to provide relative movement past one another along said rail as guided by said flanges on said rail whereby articles may be tested simultaneously in said magnetizing means and said coil.

3. An apparatus for detection of flaws in metal articles comprising,
a support base,
a receptacle in the upper side of said support base,
magnetizing means for developing a magnetic field in an article disposed over said receptacle,
means for applying magnetic particles over the article to be attracted in part to regions of the article having flaws therein and to fall in part from the article into said receptacle, and
support means for said magnetizing means including
a rail,
post means supporting said rail in overlying relationship to said receptacle,
a tailstock slidably mounted in depending, longitudinally adjustable relation on said rail, and
a headstock mounted on said post means,
said particle applying means being situated intermediate said rail and said receptacle for preventing particles supplied thereby from engaging said rail.

4. A magnetic flaw detection apparatus comprising,
a rail,
post means supporting the rail,
a first magnetizing means mounted on said post means,
a second magnetizing means slidably depending from said rail and movable therealong, and
means for applying magnetic particles to an article which may be held between said first and said second magnetizing means,
said particle applying means being situated below said rail and above said article for preventing particles emanating therefrom from impinging said rail.

5. A magnetic flaw detection apparatus comprising,
a rail,
post means supporting the rail,
a first magnetizing means mounted on said post means,
a second magnetizing means slidably depending from said rail and movable therealong,
means for applying magnetic particles to an article which may be held between said first and said second magnetizing means, and
a magnetizing coil slidably and adjustably supported by said rail in depending relationship thereto,
said rail being situated above said particle applying means for preventing impingement of said particles on said rail.

6. In magnetic flaw detection apparatus for testing articles,
a table having a bin defined in the upper portion thereof and open to the top thereof,
post means mounted on said table,
a rail supported by said post means and overlying said bin,
a pair of substantially horizontally extending spaced parallel flanges on the rail,
a bus bar on said rail positioned parallel to said flanges and adapted to be electrically energized,
a headstock on said post means,
a tailstock depending from one of said flanges and slidably movable thereon toward and away from said headstock,
an electric coil depending from the other of said flanges and slidably moveable thereon past said tailstock without interference therewith,
said coil having a support arm including means for selectively rotating the coil about an axis perpendicular to said flanges and for locking the coil in any angle of rotation,
means on said tailstock and said coil for simultaneously frictionally locking either on its respective flange and for engaging either in snug pressing engagement with said bus bar, and
means positioned above said bin and below said rail for applying magnetic particles to articles which may be held between said headstock and said tailstock and within said coil,
whereby said flanges are without the path of particles which may be applied to the articles and whereby articles may be tested in the coil and between the headstock and tailstock simultaneously.

7. An apparatus for detecting flaws in metal articles comprising,
a support base,
a receptacle in the upper side of said support base,
post means on said support base,
a rail supported on said post means in overlying relationship to said receptacle,
a tailstock slidably mounted in depending longitudinally adjustable relationship on said rail,
a headstock mounted on said post means,
an electrically energized coil slidably mounted in depending longitudinally adjustable relationship on said rail and adapted to be disposed in surrounding relationship alternatively to a test article supported thereon and also to a test article secured between said headstock and said tailstock, and
means for applying magnetic particles over an article to be tested as secured between the headstock and the tailstock or supported on the coil,
said particle applying means being situated between said rail and said receptacle for preventing the particles from settling on the rail,
the particles to be attracted in part to regions of the article having flaws therein and to fall in part from the article into the receptacle, and
magnetizing means for developing a magnetic field in the article and comprising the rail, the headstock, the tailstock and the coil.

References Cited by the Examiner

UNITED STATES PATENTS

| | | | |
|---|---|---|---|
| 2,217,733 | 10/40 | De Forest | 324—38 |
| 2,277,431 | 3/42 | Fitch | 324—38 |
| 2,421,775 | 6/47 | Doane | 324—38 |
| 2,639,355 | 5/53 | Dunsheath | 324—38 X |

WALTER L. CARLSON, *Primary Examiner.*

SAMUEL BERNSTEIN, FREDERICK M. STRADER, *Examiners.*